(12) United States Patent
Chen

(10) Patent No.: US 11,025,017 B2
(45) Date of Patent: Jun. 1, 2021

(54) LED OPERATIONAL PROFILES FOR USB-C CABLE PLUGS

(71) Applicant: HEWLETT-PACKARD DEVELOPMENT COMPANY, L.P., Houston, TX (US)

(72) Inventor: Wen Shih Chen, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 101 days.

(21) Appl. No.: 15/749,451

(22) PCT Filed: Dec. 18, 2015

(86) PCT No.: PCT/US2015/066915
§ 371 (c)(1),
(2) Date: Jan. 31, 2018

(87) PCT Pub. No.: WO2017/105519
PCT Pub. Date: Jun. 22, 2017

(65) Prior Publication Data
US 2018/0226756 A1 Aug. 9, 2018

(51) Int. Cl.
*H01R 3/00* (2006.01)
*H01R 13/717* (2006.01)
(Continued)

(52) U.S. Cl.
CPC ....... *H01R 13/7175* (2013.01); *G06F 13/382* (2013.01); *H01R 13/6691* (2013.01);
(Continued)

(58) Field of Classification Search
CPC .. H01R 13/717; H01R 13/7175; H01R 24/62; G06F 13/382
(Continued)

(56) References Cited

U.S. PATENT DOCUMENTS 6,572,402 B2 * 6/2003 Lin .................... H01R 13/7172
439/490
6,971,907 B1 * 12/2005 Stroud ............... H01R 13/6641
439/490

(Continued)

FOREIGN PATENT DOCUMENTS

CN 202957425 U 5/2013
CN 204304148 U 4/2015
(Continued)

OTHER PUBLICATIONS

Cypress Semiconductor Corp., "Cypress's USB Power Delivery Controllers for USB Type-C Cables Achieve USB-IF Certification," San Jose, California, Jun. 2, 2015, 3 p.
(Continued)

*Primary Examiner* — Hae Moon Hyeon
(74) *Attorney, Agent, or Firm* — Conley Rose PC

(57) ABSTRACT

In example implementations, an apparatus includes a plurality of light emitting diodes (LEDs) and a controller. The controller is in communication with the plurality of LEDs, a sink device and a host device. A universal serial bus type C (USB-C) functionality of the sink device and the host device is identified by the controller. The controller operates at least one of the plurality of LEDs in accordance with one of a plurality of different LED operation profiles that is associated with the USB-C functionality of the sink device and the host device.

15 Claims, 4 Drawing Sheets

(51) Int. Cl.
    *H01R 24/62* (2011.01)
    *H01R 13/66* (2006.01)
    *H05B 45/20* (2020.01)
    *H05B 47/18* (2020.01)
    *H05B 47/105* (2020.01)
    *G06F 13/38* (2006.01)

(52) U.S. Cl.
    CPC ........... *H01R 13/717* (2013.01); *H01R 24/62* (2013.01); *H05B 45/20* (2020.01); *H05B 47/105* (2020.01); *H05B 47/18* (2020.01); *G06F 2213/0042* (2013.01)

(58) Field of Classification Search
    USPC .......................................................... 439/490
    See application file for complete search history.

(56) References Cited

U.S. PATENT DOCUMENTS

| | | | |
|---|---|---|---|
| 7,581,982 B2* | 9/2009 | Mehnert | H01R 13/6691 439/490 |
| 9,619,979 B1* | 4/2017 | Montero | H01R 13/641 |
| 2004/0071410 A1* | 4/2004 | Ma | H01R 13/6641 385/88 |
| 2004/0242087 A1* | 12/2004 | Hoshina | H01R 13/641 439/894 |
| 2005/0124209 A1* | 6/2005 | Currie | H01R 13/7172 439/490 |
| 2013/0308304 A1 | 11/2013 | Tuchrelo et al. | |
| 2013/0335010 A1* | 12/2013 | Wu | H02J 7/0042 320/107 |
| 2014/0156879 A1* | 6/2014 | Wong | G06F 11/3027 710/19 |
| 2014/0256175 A1 | 9/2014 | Hardy | |
| 2014/0285119 A1 | 9/2014 | Lai | |
| 2014/0347189 A1* | 11/2014 | Weksler | H04M 1/72563 340/687 |
| 2015/0112457 A1 | 4/2015 | Chan et al. | |
| 2016/0370835 A1* | 12/2016 | Erickson | G06F 1/266 |
| 2017/0033514 A1* | 2/2017 | Wang | H01R 13/7175 |
| 2017/0222459 A1* | 8/2017 | Kang | H01R 31/065 |
| 2017/0288340 A1* | 10/2017 | Morrison | H01R 13/633 |
| 2017/0310060 A1* | 10/2017 | Cote | H01R 13/7175 |
| 2018/0109127 A1* | 4/2018 | Huang | G06F 1/266 |
| 2018/0336159 A1* | 11/2018 | Kung | G06F 13/4282 |
| 2019/0121764 A1* | 4/2019 | Regupathy | G06F 13/362 |

FOREIGN PATENT DOCUMENTS

| | | |
|---|---|---|
| CN | 204333492 U | 5/2015 |
| TW | M514162 U | 12/2015 |

OTHER PUBLICATIONS

Wang, V., "Taiwanese USB 3.1 Chips Firms Outlook," Aug. 30, 2015, 15 p.

* cited by examiner

LED OPERATIONAL PROFILES FOR USB-C CABLE PLUGS

BACKGROUND

Universal serial bus (USB) plugs are industry standard plugs, cables and connectors that are used in a bus for communication and connection. USB plugs were developed to standardize the connection of peripheral devices to computer systems. USB plugs can provide communication and electric power to the peripheral devices.

USB-C type plugs are new type of industry standard plug that has been developed that can connect to both a host device and a sink device. The USB-C type plugs provide a variety of different types of functionality.

DETAILED DESCRIPTION

The present disclosure discloses an example USB-C type plug that includes a plurality of LEDs to indicate active functions of a host device or a sink device. For example, the USB-C type plug may operate at least one of a plurality of light emitting diodes (LEDs) in accordance with an LED profile of a USB-C function. As a result, the USB-C type plug of the present disclosure provides a visual indication to allow a user to know what functions are working, are not working, and so forth.

For example, USB-C type plugs may have a variety of different functional capabilities. In addition, each functional capability may have a plurality of different profiles. However, some host devices and some sink devices may not provide, or may not be compatible with, the various functional capabilities of the USB-C type plug. As a result, when certain functions do not work (e.g., a sink device will not charge from a host device) the user may become frustrated or believe that the USB-C type plug is defective.

Figure 1:
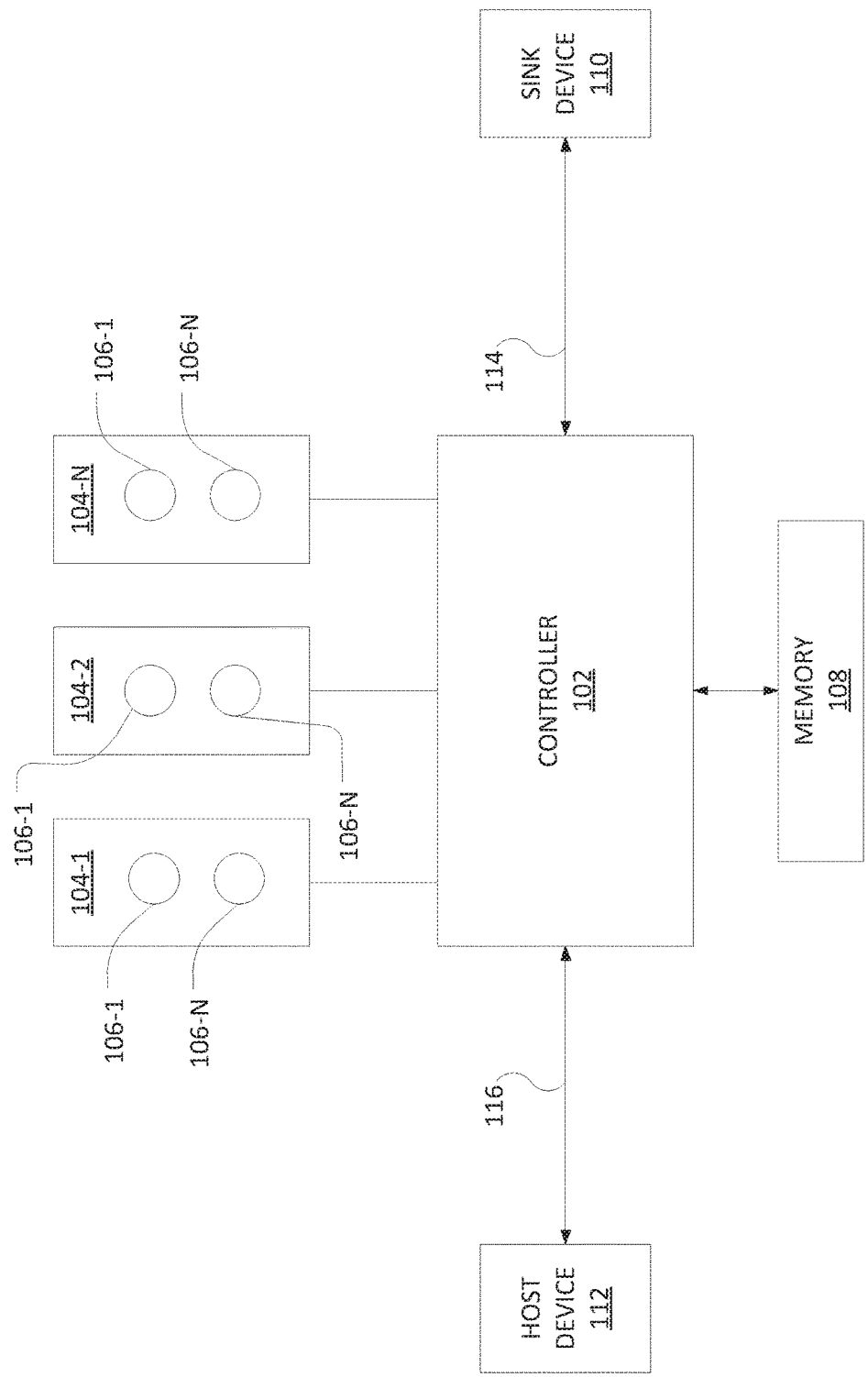
FIG. 1 is a block diagram of an example apparatus of the present disclosure.

FIG. 1 illustrates an example apparatus 100 of the present disclosure. In one example, the apparatus 100 may be a USB-C type plug or cable. The apparatus 100 may include a controller 102. In one example, the controller 102 may be a processor or an electronically marked cable assembly (EMCA) paddle card controller.

In one implementation, the controller 102 may be in communication with a plurality of light emitting diode (LED) arrays 104-1 to 104-N (herein referred to individually as an LED array 104 or collectively as LED arrays 104), a sink device 110 and a host device 112. The LED arrays 104 may each have an LED 106-1 or a plurality of LEDs 106-1 to 106-N. In one example, each LED array 104 may have a different colored LED 106. In another example, each LED array 104 may have the same colored LEDs 106. For example, each LED array 104 may have a plurality of LEDs 106 having the same different colors (e.g., LED 106-1 may be a green color, LED 106-2 may be an amber color, LED 106-3 may be a white color, and so forth for each LED array 104).

As discussed in further detail below, the controller 102 may control operation of the LEDs 106 and the LED arrays 104 in accordance with an LED operation profile that is determined by a function that is operating over the apparatus 100. In one example, the controller 102 may be in communication with a memory 108 that stores the LED operation profiles. The memory 108 may be part of the controller 102 or may be external memory (e.g., a random access memory (RAM)).

The LED operation profile may define different ways to operate the LEDs 106 of the LED arrays 104 based on the various functions that can be performed by the apparatus 100. As noted above, the apparatus 100 may be a USB-C type plug and cable. USB-C type plugs may provide many different functional capabilities. For example, USB-C type plugs may provide high speed and secure data transfer, provide a display connection or pass video information, provide power delivery or system power, and the like.

Furthermore, some functions may be further divided into additional profiles. For example, power delivery functions may have different power delivery profiles (e.g., 10 Watt (W), 18 W, 36 W, 60 W, 100 W, and the like).

Figure 2:
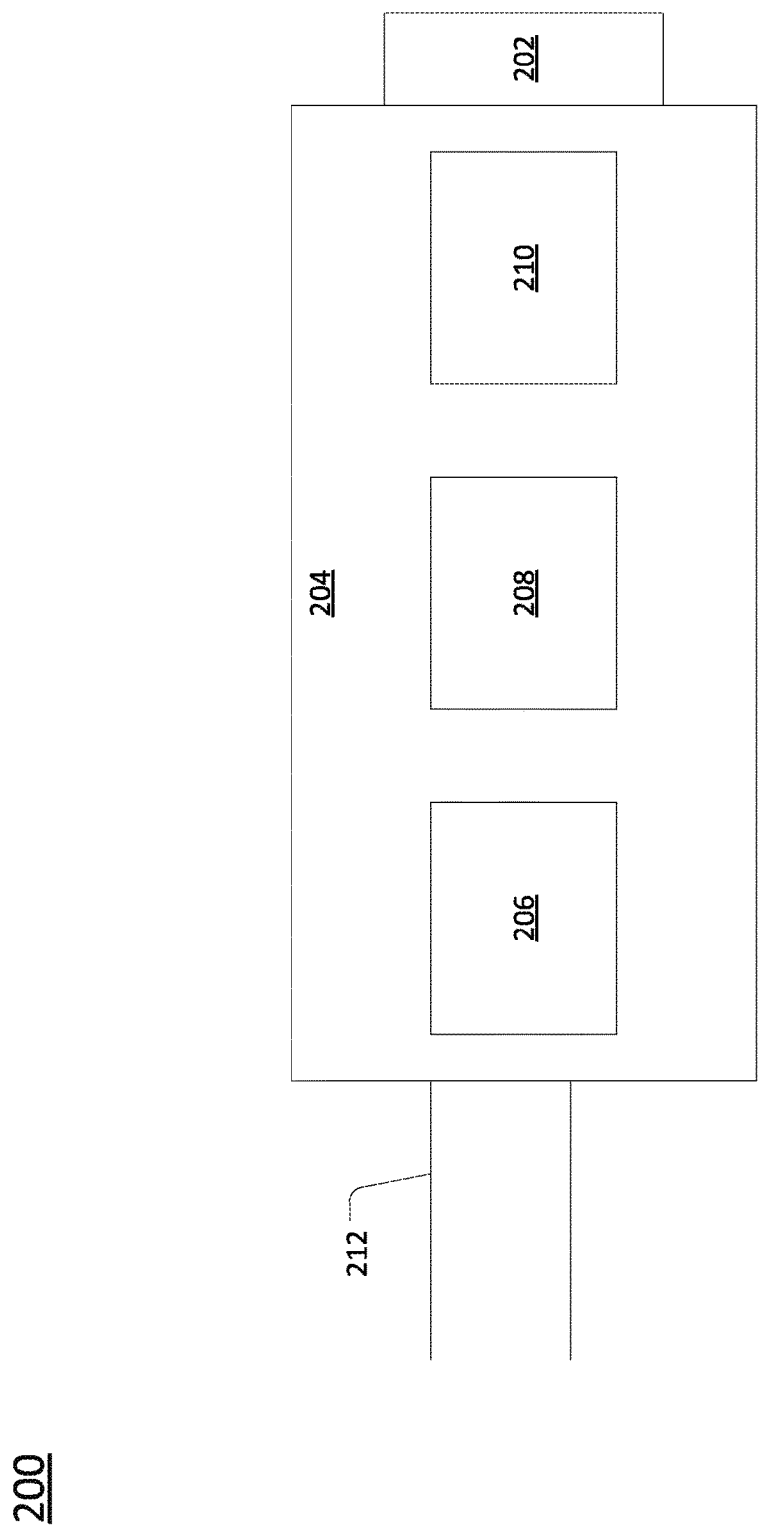
FIG. 2 is a block diagram of another view of the example apparatus of the present disclosure.

FIG. 2 illustrates an example of a USB-C type plug 200 having a jacket 204 that encloses the apparatus 100. The USB-C type plug 200 may include a connector 202 and a cable 212 that couples to another plug 200 and connector 202 (not shown). In one implementation, the jacket 204 may be a cover (e.g., a plastic cover) that encloses or forms a housing for the apparatus 100.

In one example, the jacket 204 may include a plurality of segmented windows 206, 208 and 210 (also referred to simply as windows 206, 208 and 210). The segmented windows 206, 208 and 210 may be clear portions of the jacket 204 that allow the light emitted from the LEDs 106 to shine through. The segmented windows 206, 208 and 210 may have any shape and size (e.g., rectangles, circles, squares, and the like).

The segmented windows 206, 208 and 210 may each be different sizes. For example, the segmented window 206 may be the smallest, the segmented window 208 may be slightly larger and the segmented window 210 may be the largest. In other words, the segmented windows 206, 208 and 210 may appear to be gradually larger from left to right, or vice versa.

Although three windows are illustrated in FIG. 2, it should be noted that the jacket 204 may include any number of windows. In one example, the number of windows may correspond to the number of LED arrays 104.

In one example, the LED operation profile may determine how many LEDs 106 of how many LED arrays 104 are operated to illuminate the corresponding window 206, 208 or 210. For example, while the USB-C type plug 200 is communicating between the sink device 110 and the host device 112, the white LED 106 of each LED array 104-1 to 104-N may flash in a sequence illuminating the windows 206, 208 and 210 in the sequence. In another example, the frequency or the speed at which the LEDs 106 are flashing may correspond to a particular operation. For example, a high frequency of the LEDs 106 flashing may indicate a duty cycle and a low frequency of the LEDs 106 flashing may indicate a low duty cycle.

In another example, while the USB-C type plug 200 is providing a power delivery function, a green LED 106 of each LED array 104-1 to 104-N may be turned on to illuminate each corresponding window 206, 208 and 210 as a solid green, and so forth. In one example, as the battery capacity of the sink device 110 is charging, each window 206, 208 and 210 may be sequentially illuminated by the corresponding LEDs 106 of the LED arrays 104.

An example of various different LED operation profiles is provided below in Table 1 below. It should be noted that Table 1 is an example and the color of the LEDs 106 that are turned on, the operational sequence of the LEDs 106, and a number of the windows 206, 208 and 210 that are illuminated by the LED arrays 104-1 to 104-N may vary depending on a particular application.

TABLE 1

EXAMPLE LED OPERATIONAL PROFILES

| USB-C Status | Window Status | LED |
| --- | --- | --- |
| Off | All windows off | Off |
| USB-C Host and Sink communication | Windows illuminated in a sequence | Flashing White |
| USB-C power delivery (PD) Ready | Windows illuminated | Solid Green |
| USB-C display port (DP) ready | Windows flashing | Flashing Green |
| Error Condition | Windows flashing | Flashing Amber |
| Disconnected | All windows off | Off |

Referring back to FIG. 1, the controller 102 may communicate with the sink device 110 and the host device 112 via a communication path 114 and 116, respectively. The communications paths 114 and 116 may include various different communication lines (e.g., a ground line, a SuperSpeed line, a HighSpeed line, $V_{BUS}$ line, a $V_{CONN}$ line, and the like).

In one implementation, the host device 112 may be a computer (e.g., a desktop computer, a laptop computer, a handheld device, a tablet computer, and the like). The sink device 110 may be a peripheral device (e.g., an external storage device, a display, another tablet computer, a smart phone, and the like). In one example, the host device 112 may communicate with the controller 102 to determine the capabilities of the apparatus 100. In addition, controller 102 may determine which USB-C functionality is being used or activated by the host device 112. The LED operation profile associated with the USB-C functionality that is being used may be obtained (e.g., from Table 1) and the controller 102 may operate the LEDs 106 of the LED arrays 104 in accordance with the LED operation profile.

As a result, a user may be notified of the status of the USB-C type plug 200 and the functionality that is being used. Furthermore, if the USB-C type plug 200 is fully operational, but the host device 112 or the sink device 110 are not compatible with certain USB-C type functions then the user may be notified by the error LED operational profile. For example, the host device 112 may not support video data transmission over a USB-C type plug 112. Alternatively, the host device 112 may provide power with a particular power delivery profile that is incompatible with the power that can be received by the sink device 110. Without the present disclosure, the user may be confused as to why the sink device 110 is not operating, why the sink device 110 is charging slowly, or why data is not being transferred between the host device 112 and the sink device 110.

Figure 3:
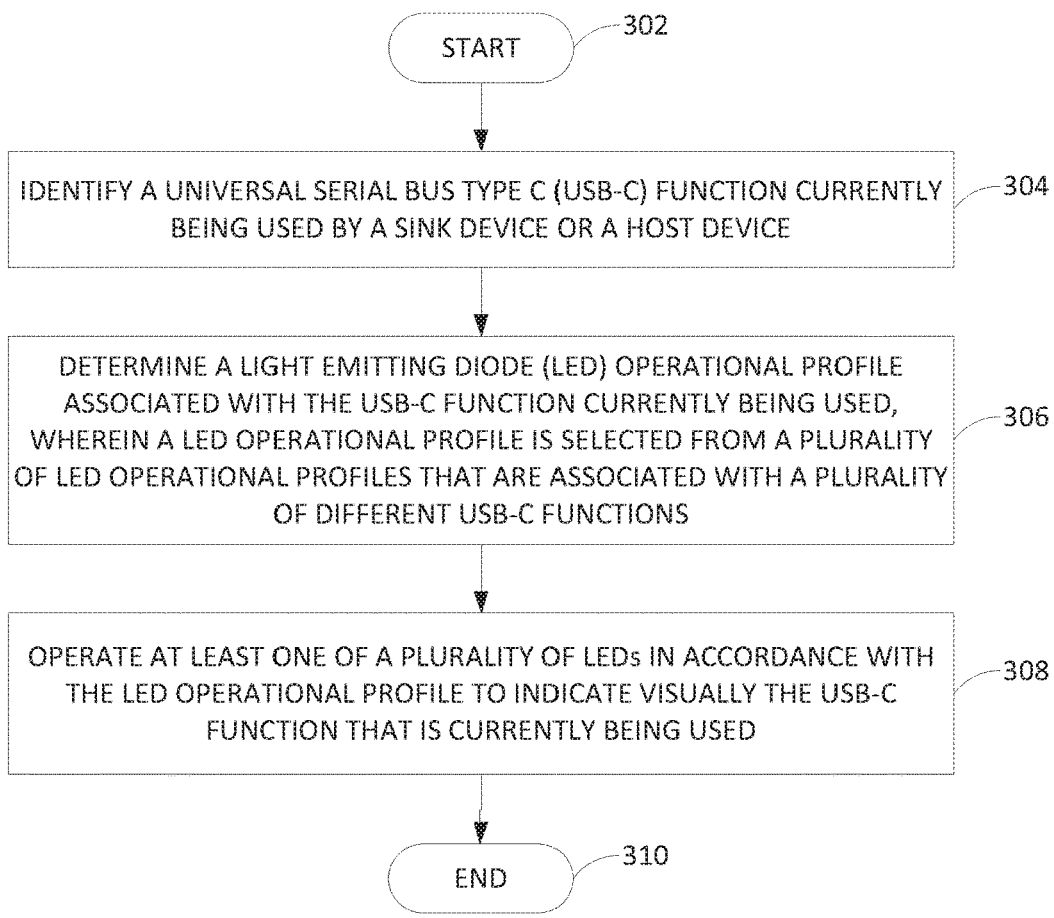
FIG. 3 is a flow diagram of an example method for operating at least one of a plurality of light emitting diodes (LEDs) in accordance with an LED profile of a USB-C function.

FIG. 3 illustrates a flow diagram of an example method 300 for operating at least one of a plurality of light emitting diodes (LED) in accordance with an LED profile of a USB-C function. In one example, the blocks of the method 300 may be performed by the apparatus 100.

At block 302, the method 300 begins. At block 304, the method 300 identifies a USB-C function currently being used by a sink device or a host device. For example, the host device may communicate with a controller in the USB-C type plug to determine the functional capabilities of the USB-C type plug. The controller may then determine which functional capabilities are active or being used by the host device.

At block 306, the method 300 determines an LED operational profile associated with the USB-C function currently being used, wherein a LED operational profile is selected from a plurality of LED profiles that is associated with a plurality of different USB-C functions. For example, the USB-C type plug can provide a variety of different functional capabilities such as, for example, high speed data transfer, transfer of video data, power delivery functions, and the like. Each possible state (e.g., an off status, an error condition status, a disconnect status, a power delivery status, a display port ready status, a data transfer status, and the like) of the USB-C type plug may be associated with a respective LED operational profile.

In one example, the LED operational profiles may be stored in memory and accessed by the controller. The memory may be part of the controller or may be external memory (e.g., RAM) that is accessed by the controller via connection to the external memory.

At block 308, the method 300 operates at least one of a plurality of LEDs in accordance with the LED operational profile to indicate visually the USB-C function that is currently being used. For example, if the LED operation profile for a power delivery USB-C function that is currently being used is turning on a green LED on each LED array to a solid light, then the controller may turn on the green LED on each LED array to a solid green light. In another example, if the USB-C function that is currently being used is an error condition and the LED operational profile associated with the error condition is flashing the amber LEDs, then the controller may flash the amber LED of each LED array.

In one embodiment, the controller may dynamically change the LED operational profile that is being used. For example, the USB-C function that is currently being used may change from an error condition to a working power delivery function (e.g., a setting was changed on the host device or a new sink device was connected). Then the controller may change the operation of the LEDs from using the LED operational profile associated with the error condition to the LED operational profile associated with the power delivery function. The controller may continuously change the LED operational profile that is being used as the USB-C function that is being used changes. At block 310, the method 300 ends.

Figure 4:
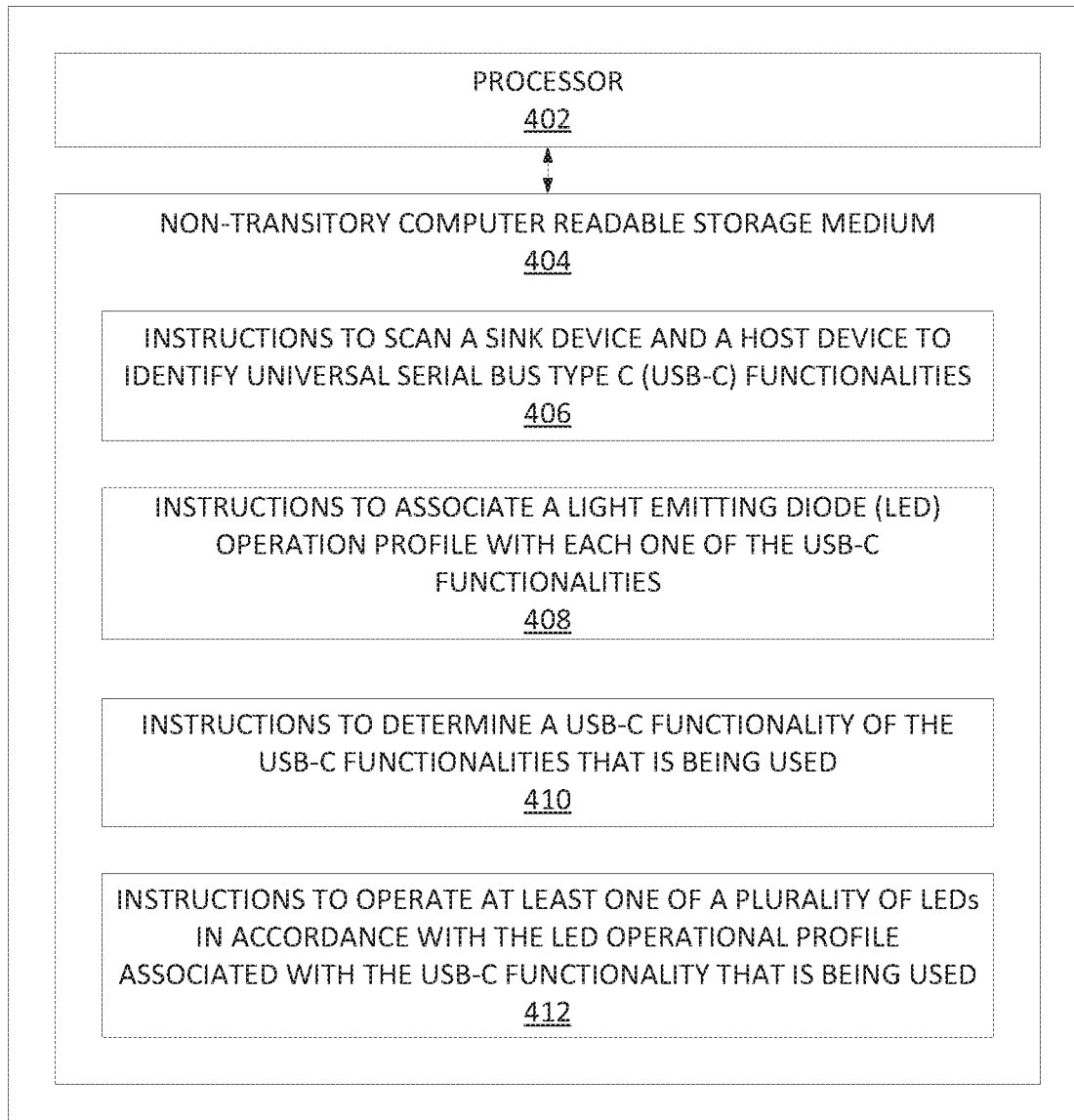
FIG. 4 is a block diagram of an example controller of the present disclosure.

FIG. 4 illustrates an example of an apparatus 400. In one example, the apparatus may be the controller 102. In one example, the apparatus 400 may include a processor 402 and a non-transitory computer readable storage medium 404. The non-transitory computer readable storage medium 404 may include instructions 406, 408, 410 and 412 that when executed by the processor 402, cause the processor 402 to perform various functions.

In one example, the instructions 406 may include instructions to scan a sink device and a host device to identify USB-C functionalities. The instructions 408 may include instructions to associate an LED operation profile with each one of the USB-C functionalities. The instructions 410 may include instructions to determine a USB-C functionality of the USB-C functionalities that is being used. The instructions 412 may include instructions to operate at least one of a plurality of LEDs in accordance with the LED operation profile associated with the USB-C functionality that is being used.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. An apparatus, comprising:
a plurality of light emitting diodes (LEDs); and
a controller in communication with the plurality of LEDs, a sink device and a host device, the controller to:
communicate with the sink device and the host device to identify supported universal serial bus type C (USB-C) functional capabilities of the sink device and the host device from among high-speed data transfer, video data transfer, first power delivery, and second power delivery;
uniquely associate a plurality of different LED operation profiles with each of the supported functional capabilities of the sink device and the host device;
identify an active USB-C function from among the supported USB-C functional capabilities of the sink device and the host device; and
operate at least one of the plurality of LEDs in accordance with one of the plurality of different LED operation profiles that is uniquely associated with the active USB-C function of the sink device and the host device.

2. The apparatus of claim 1, comprising:
a jacket enclosing the plurality of LEDs and the controller, wherein the jacket has a plurality of segmented windows.

3. The apparatus of claim 2, wherein the plurality of LEDs are to illuminate different segmented windows of the plurality of segmented windows to indicate different USB-C functionalities.

4. The apparatus of claim 1, wherein the plurality of LEDs comprises different colors.

5. The apparatus of claim 4, wherein each one of the different colors represents a different USB-C functionality.

6. The apparatus of claim 1, wherein the one of the plurality of LED operation profiles comprises illuminating the at least one of the plurality of LEDs.

7. The apparatus of claim 1, wherein the one of the plurality of LED operation profiles comprises flashing the at least one of the plurality of LEDs on and off.

8. The apparatus of claim 7, wherein different frequencies of the at least one of the plurality of LEDs flashing on and off are associated with different USB-C functionalities.

9. A method, comprising:
communicating with a sink device and a host device to identify supported universal serial bus type C (USB-C) functional capabilities of the sink device and the host device from among high-speed data transfer, video data transfer, first power delivery, and second power delivery;
uniquely associating a plurality of different light emitted diode (LED) operation profiles with each of the supported functional capabilities of the sink device and the host device;
identifying from among the supported USB-C functional capabilities of the sink device and the host device, an active universal serial bus type C (USB-C) function currently being used by the sink device or the host device;
determining a LED operational profile uniquely associated with the USB-C function currently being used, wherein the LED operational profile is selected from the plurality of different LED operation profiles; and
operating at least one of a plurality of LEDs in accordance with the LED operational profile to indicate visually the USB-C function that is currently being used.

10. The method of claim 9, wherein the plurality of LEDs comprises different colors.

11. The method of claim 10, wherein each one of the different colors represents a different USB-C functionality.

12. The method of claim 9, wherein the operating comprises illuminating the at least one of the plurality of LEDs.

13. The method of claim 9, wherein the operating comprises flashing the at least one of the plurality of LEDs.

14. A non-transitory computer-readable storage medium encoded with instructions executable by a processor, the computer-readable storage medium comprising:
instructions to communicate with a sink device and a host device to identify supported universal serial bus type C (USB-C) functional capabilities of the sink device and the host device from among high-speed data transfer, video data transfer, first power delivery, and second power delivery;
instructions to uniquely associate a plurality of different light emitting diode (LED) operation profiles with each of the supported functional capabilities of the sink device and the host device;
instructions to identify an active USB-C function from among the supported USB-C functional capabilities of the sink device and the host device; and
instructions to operate at least one of a plurality of LEDs in accordance with one of the plurality of the LED operation profiles uniquely associated with the USB-C functionality that is being used.

15. The non-transitory computer readable storage medium of claim 14, wherein the plurality of LEDs comprises different colors.

* * * * *